Aug. 31, 1965     E. B. THOMAS     3,203,160
LAWN MOWERS

Filed Feb. 18, 1963     3 Sheets-Sheet 1

INVENTOR:
EDWARD B. THOMAS
BY
*Emisie & Smiley*
Attys.

Aug. 31, 1965

E. B. THOMAS 3,203,160

LAWN MOWERS

Filed Feb. 18, 1963

INVENTOR:
EDWARD B. THOMAS
BY
*Imirie & Smiley*
Attys.

Aug. 31, 1965  E. B. THOMAS  3,203,160
LAWN MOWERS
Filed Feb. 18, 1963  3 Sheets-Sheet 3
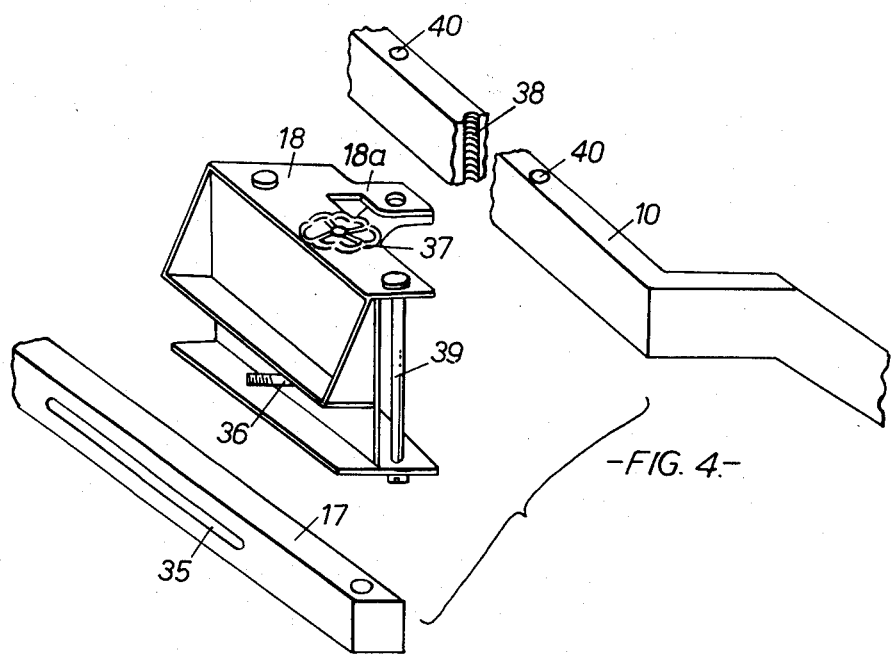
-FIG. 4.-
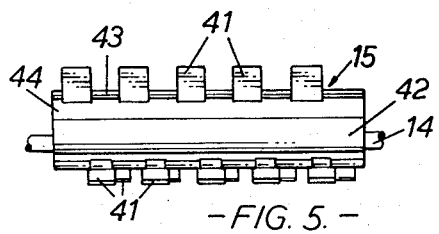
-FIG. 5.-
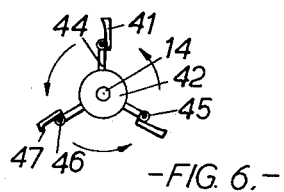
-FIG. 6.-
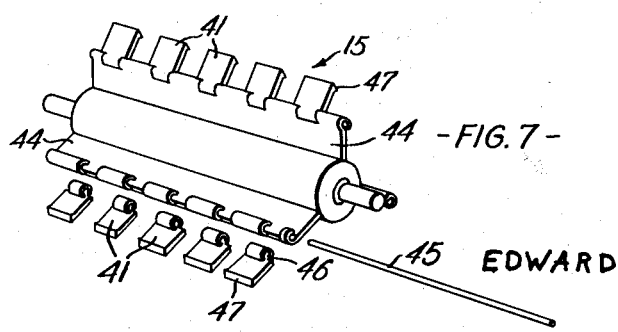
-FIG. 7-
INVENTOR:
EDWARD B. THOMAS
BY
*Smilie & Smiley*
Attys.

3,203,160
LAWN MOWERS

Edward Bernard Thomas, Oswestry, England, assignor to Edward Thomas & Company (Oswestry) Limited, Oswestry, England, a British company
Filed Feb. 18, 1963, Ser. No. 259,253
Claims priority, application Great Britain, Feb. 21, 1962, 6,663/62
3 Claims. (Cl. 56—24)

This invention is concerned with improvements in or relating to a lawn or grass mower.

According to the invention a grass mower comprises a rotatable shaft adapted to be driven at high speed and carrying a plurality of radial circumferentially spaced flail-like cutting elements which on rotation of the shaft are given a grass-cutting flailing action.

Preferably the lown mower is self-propelled through a motor which is also used to actuate the rotatable shaft.

The individual cutting elements are preferably so mounted on the rotatable shaft and shaped that in association with the mountings a fan like action is provided on rotation of the shaft thereby assisting in the sweeping up of lawn cuttings and/or debris such as leaves which may be lying on the lawn.

A particularly convenient cutter unit comprises the rotatable shaft having three rows of cutting elements hingedly mounted and radially displaced in relation to the shaft, the rows being spaced apart by 120° and the individual elements of one row being staggered in relation to the individual elements of another row.

It is furthermore preferred to provide a housing for the rotatable shaft and cutting elements which housing connects with a chute or collector box, the chute extending upwardly from the rotatable shaft housing and preferably being provided with a downwardly directed extension which directs cuttings and/or debris to a collector box or sack which is suitably disposed beneath the chute extension or which may be disposed in a light wheeled trailer towed behind the lawn mower.

The rotatable shaft is preferably driven from the motor housed within the frame-work of the lawn mower and is driven by means of a belt drive the track wheels or roller cylinder of the mower being driven from the same motor through appropriate reduction gearing, it being desirable to drive the shaft at the highest practical speed.

Means may also be provided for vertical adjustment of the cutting elements in relation to the ground and for lateral adjustment of the front axle of the mower in relation to the cutting elements.

One embodiment of a motor actuated lawn mower in accordance with the invention will now be described by way of example with reference to the accompanying drawing wherein, FIGURE 1 is an isometric view of the lawn mower with the chute extension and collector sack or box omitted.

FIGURE 4 is an exploded view of the front axle fittings of the mower,

FIGURE 5 is a side elevation of the cutter and flail-like cutting elements,

FIGURE 6 is an end elevation of the cutter, and

FIG. 7 is a perspective view of the cutter partly exploded and omitting some of the cutting elements.

Figure 1:
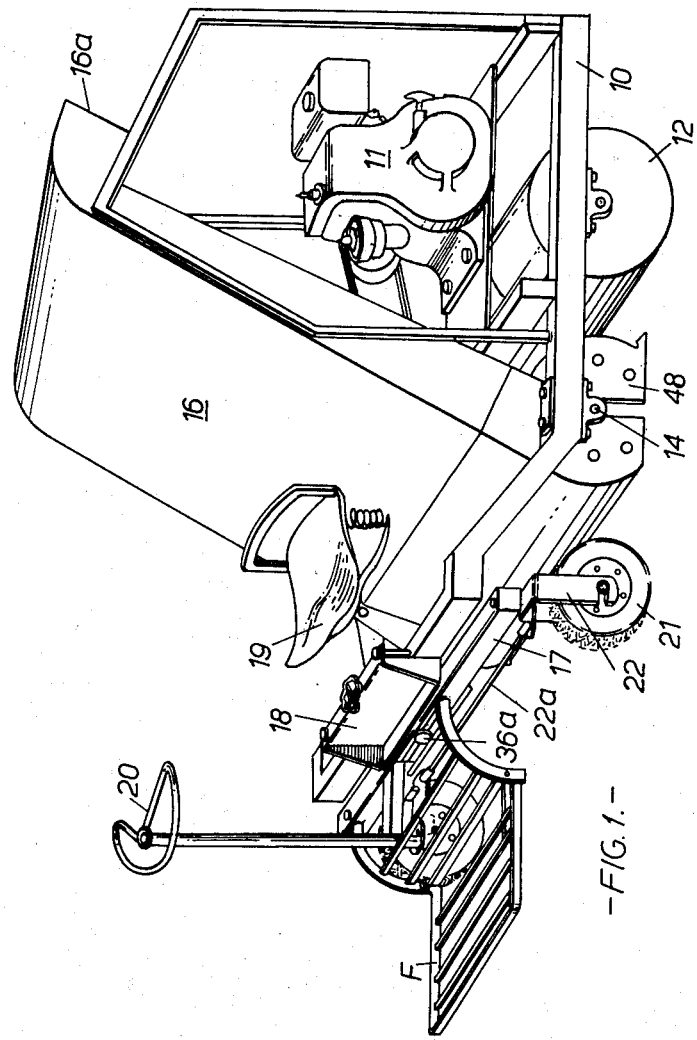
Figure 2:
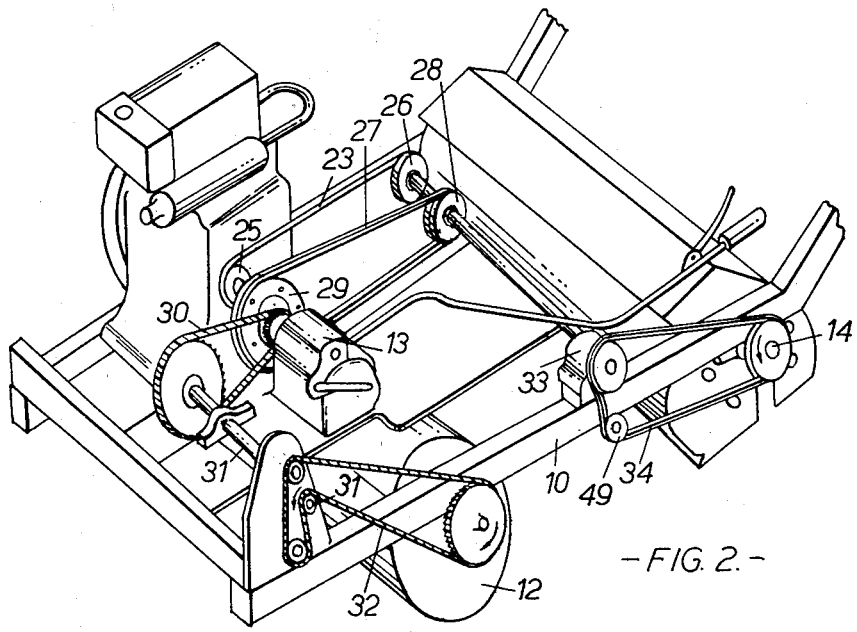
FIGURE 2 is an isometric view of the driving mechanism with the chute omitted.
Figure 3:
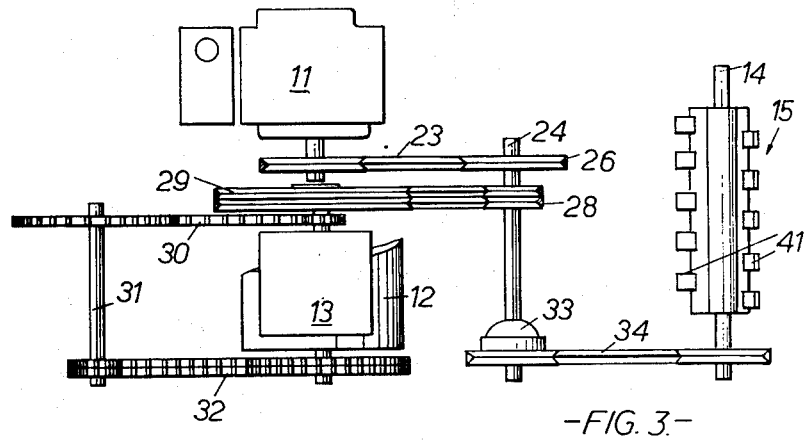
FIGURE 3 is a diagrammatic plan of the driving mechanism.

The lawn mower comprises a main frame 10 which supports a motor 11 and carries a driving roller 12, over which is mounted a gear box 13, and a rotatable shaft 14 for the cutter unit 15. The gear box conveniently will provide for three forward speeds say of 1½, 2½ and 4 m.p.h. A reverse gear can also be incorporated. A chute 16 is also mounted on the frame and may be provided, at 16a, with a downwardly extending portion (not shown) for directing cuttings to sacks or like containers fitted or carried thereunder. At the front of the frame 10 a front axle 17 is secured thereto by means of a supporting bracket 18. A driving seat 19 is also fitted to the bracket 18 at 18a. A steering wheel 20 controls the front wheels 21 which are carried by swivel brackets 22 coupled together by a track rod 22a. The swivel brackets 22 are carried from the front axle 17 by king pins.

The drive from the motor 11 is as follows.

A single belt drive 23 transmits a drive from the motor to a second motion shaft 24 by means of pulleys 25 and 26. A double V-belt drive 27 transmits a drive from pulley 28 on the second motion shaft 24, to a clutch pulley 29 on the gear box 13. A chain drive 30 transmits a drive from the gear box 13 to the counter shaft 31 and a double chain drive 32 transmits a drive from the counter shaft to the driving roller 12.

The second motion shaft 24 is also provided with a centrifugal coupling or clutch pulley 33 which is connected by a single V-belt drive 34 with the shaft 14 of the cutter 15, and an idler pulley 49 may be used as a device to tension the belt 34 and to disconnect the drive manually to the shaft 14.

The front axle 17 can be adjusted both laterally and vertically. For lateral adjustment a slot 35 is cut in the axle which receives stud 36 on the bracket 18. After appropriate lateral adjustment the front axle is secured by nut 36a screwed on to the stud 36. Vertical displacement is effected through hand wheel 37 which has a screw-threaded shaft which screws into a screw threaded hole 38 in the frame 10. The bracket 18 is guided in its vertical movement by guide pins 39 located in guide bushes 40 in the frame 10.

The cutter unit 15 has three rows of flails 41 which are hingedly mounted in an arrangement of five flails to each row, the flails of one row being staggered in relation to the flails of another row. The flails are fitted to the cutter rotor 42 between hinge bosses 43 on fins 44, the latter being spaced apart at 120°, the flails being secured in position by pins 45 passing through the flails and hinge bosses. The flails or cutting elements 41 are in the form of small plates with a hollow cylindrical boss 46 at one end through which pin 45 passes and a cutting edge 47, curved out of the end of the plate, at the other end. The cutter unit 15 is suitably enclosed in housing 48.

In operation when the second motion shaft 14 reaches a sufficiently high speed for the centrifugal clutch pulley 33 to engage, the rotor 42 is rotated at a speed to impart a flail-like action to the hinged cutting plates 41. In a particular case where the motor 11 develops 6 B.H.P. at 3600 revs. per minute, the rotor will be driven at that engine speed. The curved cutting edges of these plates 41 on contact with the grass of the lawn cut it and the cuttings assisted by the action of the current of air created by the fan-like action of the rotor are swept into the housing 48, for the cutter unit 15, and through the chute 16, and extension if used, to a collector box, sack or trailer carried behind the mower.

Any stones or similar obstacles on the lawn are swept up by the flailing action of the cutting elements and there is thus avoided any tendency to jamming of the mechanism such as occurs with mowers of a type having the usual revolving blades and fixed flat cutting edge. The vertical adjustment 37, 38 of the front axle enables the machine to be adjusted to provide for rough cutting or fine cutting of the lawn as would be required for example in the differential degree of cutting which would be used on a golf course for the greens and on other parts of the course respectively. The lateral adjustment of the front axle 17 enables the cutting device to be suitably adjusted for cutting the edges of greens or lawns.

I claim:

1. A glass mower comprising a frame, a high speed motor supported on said frame, a rotatable shaft, a housing therefor supported on said frame, driving means connecting said shaft to said motor through a centrifugal coupling, track wheels for guiding the mower, a drive roller, driving means connecting said drive roller with said motor through reduction gearing, a plurality of cutting elements consisting of small plates having hollow cylindrical bosses at one end and a cutting edge curved out of the plane of the plate at the other end, the cutting elements being arranged in rows, the elements of one row being staggered in relation to the elements of an other row, a plurality of fins radially extending from said rotatable shaft a distance at least as great as the radial length of said cutting elements and spaced circumferentially of the shaft hinge bosses spaced apart on said fins at the edges remote from the shaft, and hinge pins directly securing the hollow cylindrical bosses of said cutting elements in pivotal mounting between the hinge bosses on said fins.

2. A grass mower in accordance with claim 1 wherein means are provided on the frame for adjustment, in the vertical, plane, of the cutting elements in relation to the ground.

3. A grass mower in accordance with claim 1 wherein means are provided for lateral adjustment of the track wheels in relation to the rotatable shaft carrying the cutting elements.

References Cited by the Examiner

UNITED STATES PATENTS

| | | | |
|---|---|---|---|
| 2,667,022 | 1/54 | Richey | 56—26 X |
| 2,674,837 | 4/54 | Buck | 56—26 |
| 2,765,861 | 10/56 | Ekas | 56—26 X |
| 2,902,813 | 9/59 | Brady | 56—24 |
| 2,990,019 | 6/61 | Finn | 56—289 X |
| 3,092,946 | 6/63 | Mathews | 56—24 |
| 3,107,921 | 10/63 | Williams et al. | 56—24 X |
| 3,122,871 | 3/64 | Frevik et al. | 56—24 X |
| 3,128,729 | 4/64 | Henson | 56—24 X |

FOREIGN PATENTS 1,098,760  2/61  Germany.

ABRAHAM G. STONE, *Primary Examiner.*

RUSSELL R. KINSEY, T. GRAHAM CRAVER,
*Examiners.*